Oct. 31, 1950     C. H. WHITE     2,527,607
DISK HARROW
Filed Dec. 6, 1944     2 Sheets-Sheet 2
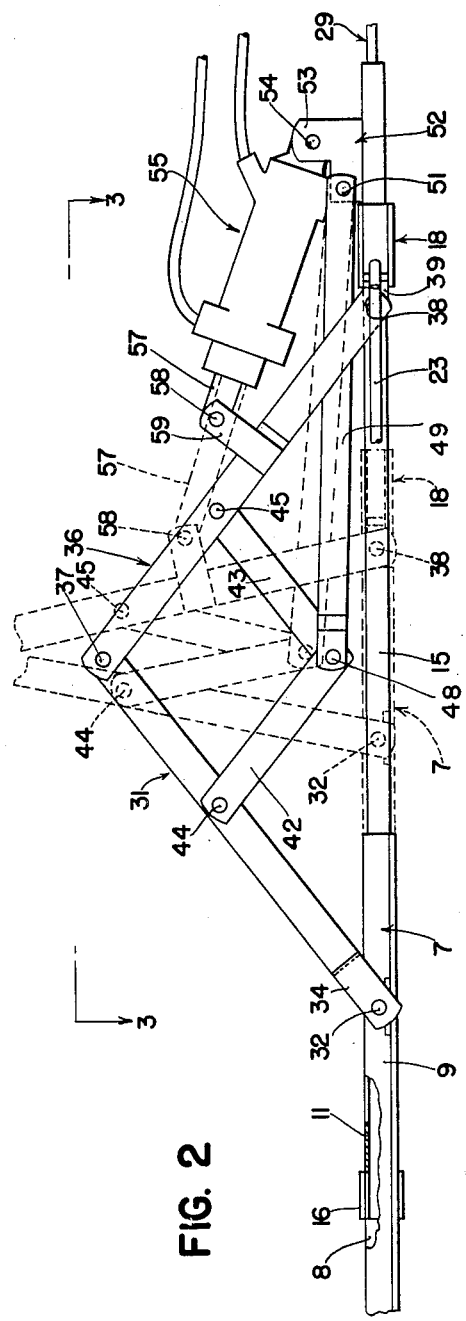
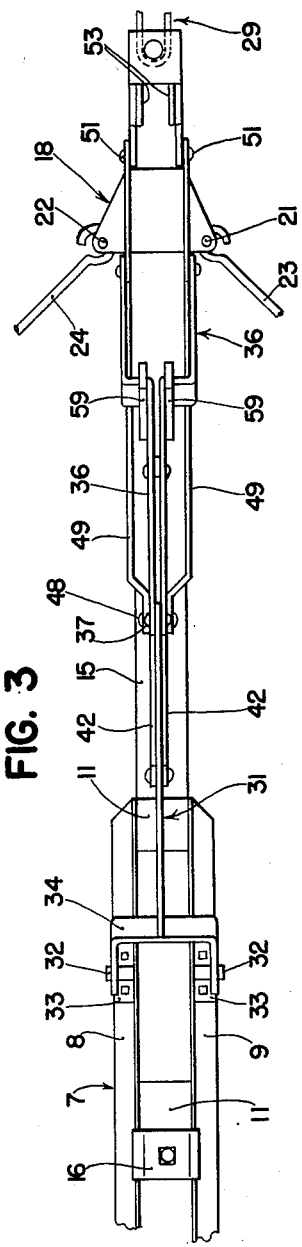
*INVENTOR.*
CHARLES H. WHITE
ATTORNEYS
WITNESS Patented Oct. 31, 1950

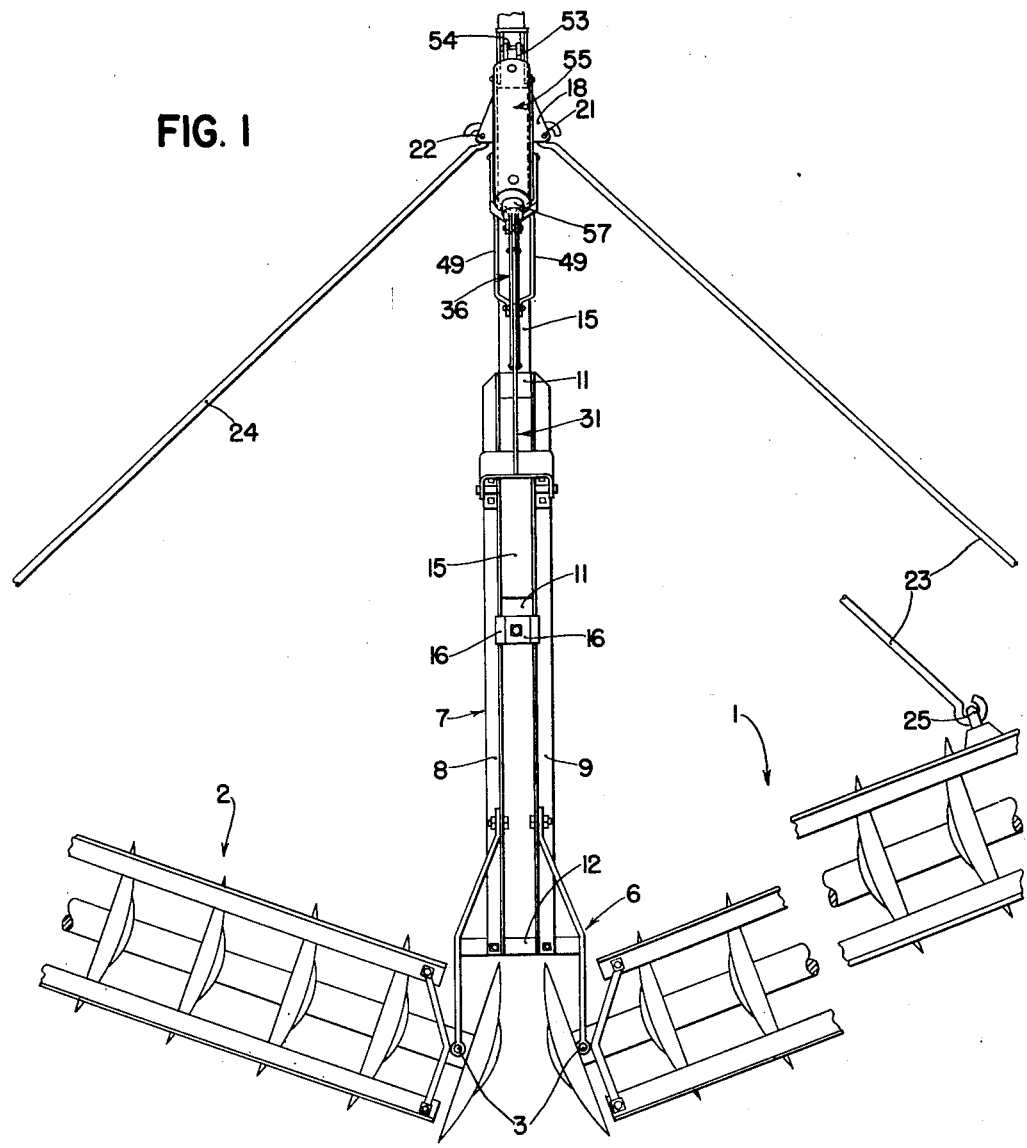

2,527,607

UNITED STATES PATENT OFFICE 2,527,607

DISK HARROW

Charles H. White, Moline, Ill., assignor to Deere & Company, Moline, Ill., a corporation of Illinois Application December 6, 1944, Serial No. 566,790

15 Claims. (Cl. 55—81)

The present invention relates generally to agricultural implements more particularly to disk harrows.

The object and general nature of the present invention is the provision of means for straightening and angling the disk gang or gangs of the harrow by power, and by way of example I have shown a disk harrow of the type that is adapted to be propelled by a tractor having a source of hydraulic power and a double acting hydraulic jack operatively associated therewith and adapted to be mounted on the harrow for angling and straightening the gang or gangs.

More particularly, it is a feature of this invention to provide an arrangement for connecting the hydraulic jack with the gang or gangs to be controlled, the connections being effected by mechanism which materially reduces the load on the hydraulic mechanism. Particularly, it is the feature of this invention to swing the gang or gangs each about a generally centrally located virtual pivot axis whereby when the gang is swung in either one direction or the other, a portion of the gang moves rearwardly while the other portion moves forwardly. This produces in effect a balanced condition and is admirably adapted to be operated by a hydraulic mechanism of the type including a double acting hydraulic jack, that is, one in which power may be applied in either direction. In some harrows with which I am familiar, the gangs are arranged to move, some into their straightened position and some into their angled position, solely or principally by virtue of the soil resistance against the disks, in which case the mechanism for swinging the gang in the other direction must, if operated while the outfit is in motion, act against the soil pressure on the entire length of the gangs. If this is done through a power unit deriving power from the tractor, it will be seen that the power requirements for a unit of this kind would be excessive. By providing a double acting jack and arranging the operating connections so that the disk gang is more or less in a balanced position as regard soil pressure against the disks, and by both angling and straightening the gang by power, the effect is to distribute the power requirement over both the angling and straightening phases, thus reducing the load by eliminating what would otherwise be a peak power requirement when moving the gangs against forward soil resistance.

Another feature of this invention is the provision of a power operated disk harrow in which new and improved motion multiplying linkage is connected between the hydraulic jack and the disk gangs and especially adapted to operate with harrows of the wide spread type in which the amount of movement required greatly exceeds the usual amount of movement available in the type of hydraulic jack usually supplied with farm tractors.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a plan or top view of a disk harrow of the single action wide spread type in which the principles of the present invention have been incorporated.

Figure 2 is a fragmentary enlarged side view of the operating linkage and the hydraulic jack unit which operates through the linkage for both angling and straightening the gangs by power.

Figure 3 is a view taken generally along the line 3—3 of Figure 2, with the hydraulic jack removed in order to show the other parts somewhat more clearly.

Referring now more particularly to Figure 1, the disk harrow in which the principles of the present invention have been incorporated includes a pair of right and left hand gangs 1 and 2 connected at their inner ends, as at 3, to a bracket structure 6 that forms a rear portion of a central frame or drawbar member 7. The latter includes a pair of laterally spaced angles 8 and 9 suitably connected together at their front and rear ends, as at 11 and 12, by connecting plates or other suitable means. Slidably or telescopically associated with the rear drawbar member 7 is a front draft-receiving hitch member 15, preferably a part in the form of a channel slidable between the angles 8 and 9. A plate 16 is secured to the rear end of the channel 15 and serves as a stop limiting the forward movement of the member 15 relative to the member 7, the stop 16 coming up against a plate which forms the connection 11 between the front ends of the angles 8 and 9. A front slide 18 carries pivots 21 and 22 which receive, respectively, the front ends of a pair of draft links 23 and 24, the rear ends of which are connected, as at 25 to the outer ends of the gangs 1 and 2.

The hitch member 15 is adapted to be connected to a farm tractor or the like, as by a clevis or other type of connection, as at 29, so as to receive propelling force therefrom and be propelled thereby.

As is indicated in Figure 1, the harrow shown is of the wide spread type, that is the gangs 1 and 2 extend laterally outwardly for a considerable distance so as to work a fairly wide strip of soil, it being understood that the disk gangs 1 and 2 are to be swung into an angled position with respect to the direction of forward travel when the gangs are to be swung into an operating or soil working position, and that when the implement is to be transported from one field to another or along a road or highway, the gangs 1 and 2 are swung into a straightened or directly outwardly extending position so that the disks roll along the surface of the ground rather than penetrating into and working the soil. It will also be understood that in a wide spread disk harrow of this type considerable extent of movement is required to bring the disks into and out of their angled and working positions. For example, one disk harrow of the type shown in Figure 1 requires, for angling or straightening the gangs, a total movement of approximately three or four times the movement of a conventional type hydraulic jack which is commonly furnished with the tractor and which, for most purposes, has a standardized extent of movement, such as, for example, eight inches. One of the principal features of the present invention is the provision of means for angling and straightening the disk gangs by power from the tractor, preferably through the use of a hydraulic jack or ram which has a normal extent of movement appreciably less than the necessary movement of the harrow parts, and another important feature of the present invention is the provision of mechanism which not only multiplies the movement of the conventional-type hydraulic jack but, in addition, reduces the load against which the jack operates, and the connections by which these objects are realized will now be described.

An arm 31 is pivoted, as at 32, to a pair of brackets 33 supported by the frame member angles 8 and 9, to this end the arm or link 31 being provided with a bifurcated portion 34 to receive the pivot pins 32. Normally, the link or arm 31 extends upwardly and forwardly from its point of pivotal connection with the drawbar or frame member 7. A second arm or link 36 is pivoted by a pin or the like, as indicated at 37, to the upper forward end of the rear link or arm 31, and at its forward or lower end the arm or link 36 is pivoted by pins 38 or the like to brackets 39 carried by the slide member 18. Two equalizing links 42 and 43 are pivoted at 44 and 45 to midpoints on the links 31 and 36, and the equalizing links 42 and 43 are pivotally connected together by a transverse pin 48. An anchoring link 49 receives the pin 48 at its rear end and extends generally forwardly and is pivoted to a pin 51 carried by a bracket member 52 fixed to the front portion of the draft-receiving member 15. The bracket 52 has lug extensions 53 which are opertured to receive a pin 54 by which the front end of a hydraulic jack or ram 55 may be connected thereto. The part connected to the bracket 52 preferably forms a cylinder of the ram or jack 55, the piston operating with the cylinder being connected to a piston rod member 57 which, at its rear end, is received by a pin 58 supported by brackets 59 fixed as by welding to the link or arm 36. The ram 55 is of the double acting type, that is, one wherein fluid may be applied to force the piston rod 57 inwardly of the cylinder or outwardly of the cylinder, as desired, operating fluid being directed to the ram 55 through a pair of hose lines or the like. The tractor which propels or draws the disk harrow is provided with a source of hydraulic power and suitable valve mechanism controlling the application of fluid under pressure to and from the ram 55. Mechanism of this type is well known and need not be described further here.

The operation of the disk harrow described above is substantially as follows.

The arms 31 and 36, together with associated parts, constitute a motion multiplying linkage of the pantograph or lazy tongs type, and this linkage is, in effect, anchored by the link 49 to the draft-receiving member 15 to which the hydraulic jack 55 is also anchored so as to transmit its operating reaction thereto. As best shown in Figure 2, when the gangs are in their angled or working position (Figure 1) the slide 18 occupies a position well forward on the draft-receiving member 15. At the same time, the drawbar member or frame member 7 occupies a position to the rear of the draft-receiving hitch member 15 with the plate 11 up against the stop plate 16. This is a position the parts occupy when the disk harrow is drawn by the tractor across the field for working the ground, the forward pull or draft being transmitted from the draft-receiving member 15 to the inner ends of the gangs 1 and 2 by the frame or drawbar member 7 and through the links 23 and 24 to the outer ends of the gangs, the motion multiplying linkage being held in its extended position (full lines, Figure 2) by locking the fluid in the hydraulic ram 55. When it is desired to straighten the gangs 1 and 2 fluid is directed into the hydraulic ram 55 so as to cause the piston rod 57 thereof to be forced rearwardly. Since the linkage 31, 36 is anchored at its midpoint by the anchoring link 49 to the draft-receiving member, the rearward movement of the piston rod 57 results in a rearward swinging movement of the arm 36 and a forward swinging movement of the arm 31, these and associated parts moving into the position shown in dotted lines in Figure 2. From this showing it will be seen that when the hydraulic ram 55 is extended the slide 18 is forced rearwardly, relative to the draft-receiving member, while the frame member or drawbar member 7 is forced forwardly. Thus, each of the disk gangs 1 and 2 is swung in a generally horizontal direction about what might be termed a virtual and centrally disposed pivot axis, for each gang is operated so that its outer end moves rearwardly and its inner end moves forwardly when being shifted from an angled position into a straightened position, it being understood that the tractor and the disk harrow continue their forward movement while angling and straightening the harrow. When the disk harrow is to be moved from a straightened position into an angled position, the fluid is directed under pressure into the other end of the cylinder of the ram 55 so as to cause the piston 57 to be drawn forwardly. This swings the arms 31 and 36 from their dotted line position into their full line position, Figure 2, thus moving the slide 18 forwardly relative to the draft-receiving member 15 while the frame member 7 is moved rearwardly. By virtue of this arrangement it will be seen that only a relatively small amount of power is required, either to angle or to straighten the gangs, since they are substantially balanced, in effect, about their virtual pivot points. Further, it will also be observed that a relatively great extent of movement between the drawbar member 7, which is connected to the inner ends of the gangs, and the slide member 18, which is connected to outer ends of the gangs, is produced by only a relatively small amount of movement of the hydraulic unit 55. In the form of the invention chosen for illustration, the ratio of movement is approximately four to one, but it will be understood that this ratio may be changed or modified, as desired, as by connecting the pivot 58 to the arm 36 at different points closer to or farther away from the pivot 37. While it is desirable to anchor or connect the ram 55 to the draft-receiving member 15, the ram unit 55 may, for example, be connected directly between the pivot points 37 and 48, if desired, or between any other suitable points in the linkage 31, 36. An advantage of connecting the ram unit 55 to the draft-receiving member 15 is that there is little relative movement between the ram 55 and the tractor and also relatively short hose lines suffice to connect the ram with the power unit of the tractor.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a disk harrow adapted to be connected with a tractor, a generally transversely arranged gang swingable in a normally horizontal plane, a hitch construction including a part connected to the tractor to receive a propelling force, gang shifting mechanism including two sections connected with opposite end portions of said gang and each movable relative to said part, and means reacting against said part and connected with said sections for shifting them in opposite directions relative to said part so as to swing the inner end of said gang in one direction and the outer end of said gang in the other direction.

2. A disk harrow comprising a pair of generally transversely extending gangs, a drawbar member to which the inner ends of said gangs are connected, a draft-receiving hitch member with respect to which said drawbar member is movable in a generally fore and aft direction, a third member also movable in a generally fore and aft direction relative to said hitch member and operatively connected with the outer ends of said gangs, motion reversing linkage anchored to said hitch member and connected with said drawbar member and said third member for shifting said latter two members in opposite directions relative to said hitch member, gang shifting means, and means connecting said gang shifting mechanism to said hitch member and said linkage whereby when said third member is shifted forwardly relative to said hitch member said drawbar member is shifted rearwardly relative to said hitch member.

3. In a disk harrow having a disk gang adapted to be swung into different angular positions in a generally horizontal plane, a pair of telescopically associated members, one being connected to the inner end of said gang and the other member being adapted to receive a draft force, a third member slidably mounted on said outer member and operatively connected with the outer end of said gang, and mechanism anchored with respect to said other member and operatively connected with said one member and said third member for shifting them in opposite directions relative to said other member.

4. A disk harrow comprising a pair of disk gangs, means serving as a frame member to which the inner ends of said disk gangs are pivotally connected for generally fore and aft swinging movement in a generally horizontal plane, a hitch member shiftable generally in a fore and aft direction relative to said frame means, a slide movable along said hitch member generally in front of said frame means and operatively connected with the outer ends of said disk gangs, linkage anchored to said hitch member and connected, respectively, with said slide and said frame means for shifting them in opposite directions relative to said hitch member, and a hydraulic ram unit connected with said hitch member and said linkage for operating the later.

5. A disk harrow comprising a gang swingable generally in a horizontal plane to dispose the disk gang either in a transverse position or in an angled position, a pair of members connected, respectively, with the inner and outer ends of said disk gang, a third member with respect to which said first mentioned members are movable, a reversing linkage connected at a mid-point with said third member and at its ends with said pair of members, and a hydraulic ram unit connected at one end with said third member and at its other end with said reversing linkage for actuating the latter.

6. A disk harrow comprising a pair of disk gangs, a rear frame member pivotally connected at its rear end to the inner ends of said gangs, a hitch member telescopically associated with said frame member and shiftable fore and aft with respect thereto, stop means limiting the outward movement of said hitch member relative to said frame member, a slide mounted on said hitch member forward of said frame member, links extending rearwardly and outwardly from the slide and connected at their rear ends, respectively, to the outer ends of said gangs, mechanism anchored to said hitch member and connected, respectively, with said slide and the forward end of said frame member for shifting them in opposite directions relative to said hitch member, and a power operated unit also anchored to said hitch member and connected to operate said mechanism for shifting said frame member and said slide in opposite directions, the inner ends of said gangs moving with said frame member and the outer ends of said gangs moving with said slide.

7. The invention set forth in claim 6, further characterized by said power unit being connected with said mechanism at such a point that a movement of the frame member relative to the slide is multiplied as compared with the extension of the power unit.

8. In a disk harrow having a horizontally swingable disk gang, a pair of members connected, respectively, with the inner and outer ends of said gang, a hitch member with respect to which both of said first mentioned members are relatively movable, a power unit in the form of a hydraulic jack pivotally connected at one end to said hitch member, and means connected between the other end of said hydraulic jack and both of said other members for shifting the latter in opposite directions relative to said hitch member.

9. In a disk harrow having a horizontally swingable disk gang, a pair of members connected, respectively, with the inner and outer ends of said gang, a hitch member with respect to which both of said first mentioned members are relatively movable, a power unit in the form of a hydraulic jack pivotally connected at one end to said hitch member, and mechanism connected with and operated by extension of the other end of said hydraulic jack for shifting both of said slide and frame members in opposite directions relative to the hitch member by an amount greater than the extension of the hydraulic jack.

10. A disk harrow comprising a disk gang adapted to be swung in a horizontal plane between straightened and angled positions, a pair of telescopically associated members, one connected with one end of said gang and the other adapted to receive a propelling force, a third member connected with the other end of said gang and shiftable relative to said first mentioned members, a double action hydraulic jack connected to react against the other member of said pair of members, and means connecting said jack with said one member to said third member for shifting them in opposite directions so as to swing said gang about a generally central vertical pivot, movement of said jack in one direction serving to swing said gang about said generally central vertical pivot to straighten the gang and movement of said jack in the other direction serving to angle said gang.

11. In a disk harrow, a generally transversely arranged gang swingable in a normally horizontal plane, a hitch construction including relatively movable parts connected, respectively, with opposite ends of said gang and a draft-receiving part with respect to which said relatively movable parts are shiftable, a rigid member connected with said draft-receiving part, a pair of relatively movable arms shiftably connected with said rigid member and connected, respectively, with said relatively movable parts, and power means mounted on said rigid member and connected with said relatively movable arms for shifting the latter so as to change the angle of said gang.

12. In a disk harrow having a shiftable disk gang, a forward drawbar member adapted to receive draft, a pair of relatively movable parts slidable on said drawbar member and connected, respectively, with opposite ends of said disk gang, a pair of arms pivotally connected, respectively at their lower ends, with said relatively movable parts, means interconnecting said arms so that when one is swung in one direction the other is swung in the other direction, and means acting against said drawbar member and connected with said arms for swinging said arms in opposite directions, thereby acting through said relatively movable parts for changing the angle of the disk gang of said harrow.

13. A disk harrow including a pair of disk gangs, a hitch construction comprising a rear drawbar member connected with the inner ends of said gangs, a forward draft-receiving drawbar member slidably associated with said rear drawbar member, a part slidable on said front drawbar member and connected with the outer ends of said gangs, a pair of levers connected, respectively, with said rear drawbar member and said slidable part, a rigid member connected at its forward end with the forward portion of said front drawbar member and pivotally connected at its rear end with said levers, and a power unit connected with said levers and reacting against said rigid member for shifting said levers in opposite directions.

14. In a disk harrow having a draft-receiving drawbar member, a pair of parts slidable relative thereto, a rigid member pivotally connected at its forward end with said drawbar member, a pair of arms pivotally connected with the rear portion of said rigid member and at their lower ends pivotally connected, respectively, with said slidable parts, means interconnecting said arms whereby when one is swung in one direction the other is swung in the opposite direction, a power unit including a piston and cylinder device, means connecting the forward end of said device with the forward portion of said rigid member, and means connecting the rear portion of said device with the rear pivoted arms.

15. In a disk harrow having a pair of relatively slidable drawbar members, the rear member being connected with the inner end of the disk gang, and a slide movably mounted on the other drawbar member and connected with the outer end of the associated disk gang, a power angling attachment comprising a rigid member, means supporting the latter on said drawbar members, a pair of relatively shiftable arms pivotally connected with said rigid member and connected, respectively, with said rear drawbar member and said slide, and a power unit mounted on said rigid member and connected to swing said arms in opposite directions for changing the angle of said disk gang by shifting said slide and rear drawbar member in generally opposite directions.

CHARLES H. WHITE.

REFERENCES CITED

The following references are of record in the file of this patent:

UNITED STATES PATENTS

| Number | Name | Date |
|---|---|---|
| Re. 22,225 | Hornish | Nov. 24, 1942 |
| 338,982 | La Dow | Mar. 30, 1886 |
| 1,941,504 | White | Jan. 2, 1934 |
| 2,041,216 | Sjogren | May 19, 1936 |
| 2,114,549 | Taylor | Apr. 19, 1938 |
| 2,175,243 | Book | Oct. 10, 1939 |
| 2,303,320 | Benjamin | Dec. 1, 1942 |
| 2,303,325 | Cheek | Dec. 1, 1942 |
| 2,319,458 | Hornish | May 18, 1943 |
| 2,325,856 | Hornish | Aug. 3, 1943 |

Certificate of Correction

Patent No. 2,527,607                                                    October 31, 1950

CHARLES H. WHITE

It is hereby certified that error appears in the printed specification of the above numbered patent requiring correction as follows:

Column 5, line 37, after the word "part" insert *adapted to be*; and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*